Figure 2:
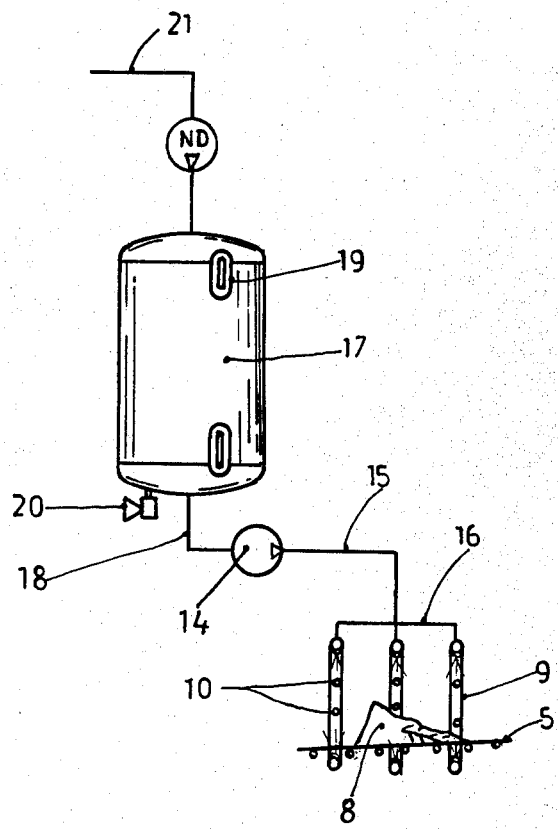

United States Patent [19]

Dietrich

[11] 4,355,433
[45] Oct. 26, 1982

[54] APPARATUS FOR CLEANING ROOT CROPS IN THE FIELD

[76] Inventor: Martin Dietrich, Paternoster 5, Mertingen, Fed. Rep. of Germany

[21] Appl. No.: 188,363

[22] Filed: Sep. 18, 1980

[30] Foreign Application Priority Data

Sep. 22, 1979 [DE] Fed. Rep. of Germany ....... 2938439

[51] Int. Cl.³ .............................................. B08B 3/02
[52] U.S. Cl. ...................................... 15/302; 15/3.14; 15/3.15; 15/3.16; 134/63; 134/115 R; 134/133; 56/328 R
[58] Field of Search ...................... 15/3.14, 3.15, 3.16, 15/302; 134/63, 68, 104, 115 R, 133, 199; 56/328 R

[56] References Cited

U.S. PATENT DOCUMENTS

| | | | |
|---|---|---|---|
| 2,156,840 | 5/1939 | Davis | 134/63 |
| 2,322,417 | 6/1943 | Christian | 134/199 UX |
| 2,393,596 | 1/1946 | Dexter | 134/63 X |
| 2,647,525 | 8/1953 | Duda et al. | 134/63 |
| 2,666,711 | 1/1954 | Crosset | 15/302 X |
| 3,827,446 | 8/1974 | Honeycutt | 134/115 R X |
| 4,236,581 | 12/1980 | Beckett | 56/328 R X |

Primary Examiner—Robert L. Bleutge
Attorney, Agent, or Firm—Holman & Stern

[57] ABSTRACT

An apparatus for cleaning root crops while still in the field whereby the harvested crops are subjected to jet blasts of a cleaning agent without excessive dust generation.

7 Claims, 5 Drawing Figures

APPARATUS FOR CLEANING ROOT CROPS IN THE FIELD

BACKGROUND OF THE INVENTION (1) Field to Which the Invention Relates

According to a first basic idea the invention relates to an installation for the cleaning in the field of root crops, especially sugar-beets by means of jets of a cleaning agent hitting the beats on all sides after lifting them off the ground.

A method with those generic features is known from the German publicly distributed printed application No. 26 55 781 (DE-OS). With this known method air is used as the cleaning agent. This known method produces satisfactory results for many applications. However, the high air consumption may be disadvantageous, especially if important quantities of root crops must be cleaned as is the case e.g. with multi-share harvesting equipment. An additional problem may be the control of the dust produced, particularly with dry soil.

(2) Short Outline of the Invention

Starting from these facts one basic problem solved by the present invention was to create an installation for a method as outlined above, having a high output of root crops to be cleaned combined with a high cleaning effect and avoiding the production of duct. An other basic problem solved by the present invention was to make available a simple and economic device for the performance of the method.

According to the present invention the solution of the first basic problem consists of the use of a liquid as cleaning agent, preferably water, at least in a preponderant part.

The liquid jets hitting the root crops to be cleaned are relatively hard and thus reliably able to loosen and to remove strongly adhering dirt. The liquid to be used makes it possible in an advantageous manner to soak the root crops to be cleaned, thus facilitating the subsequent dirt removal. The method according to the invention combines a great output with a relatively low cleaning liquid consumption. This allows in an adventageous way to proceed preferably with continuous jets. The cleaning liquid, after having hit the root crops to be cleaned, washes away in an advantageous manner the dirt removed, which not only avoids dust practically right from the beginning but also guaranties an automatic dirt evacuation. By collecting the dirt laden outgoing cleaning liquid and extraction of the dirt it is possible to to maintain the cleaning liquid practically in a closed circuit with a relatively small loss. The water tanks or the like necessary to compensate the losses therefore may be relatively small, which in an advantageous way allows a most compact construction. Simultaneously it is possible in an advantageous way to soak the root crops in the collected cleaning liquid thus performing a preliminary cleaning.

A preferred embodiment of the basic invention may consist of the production, at least partially, of the cleaning liquid by sapping of the vegetable products, e.g. the leafs which must be separated from the roots. This measure obviously is advantageous when cleaning beets since there is available a sufficient quantity of leaf and-/or stalk material and the like, having a relatively high water content which can be sapped. As has been demonstrated by tests, the water produced by sapping in most cases covers the total needs. Therefore a reconditioning is not necessary, which has an advantageous effect on the concept of the device. On the other hand these vegetable by-products and clippings are dehydrated, at least to a great extent, on the field thus representing practically a durable or at least an easily preservable fodder containing, as desirable, a great quantity of bulk. The usual silage of beet leafs and the like, often undesirable for environmental reasons, can be avoided in an advantageous way. This in turn avoids the much feared hyperacidity of the stomach of animals fed with silage products.

Other appropriate configurations of the installation for the method according to the invention and advantageous measures for the production of suitable devices for the performance of the method will result and will be described with reference to the drawings in some examples of execution.

LIST OF FIGURES

Figure 1:
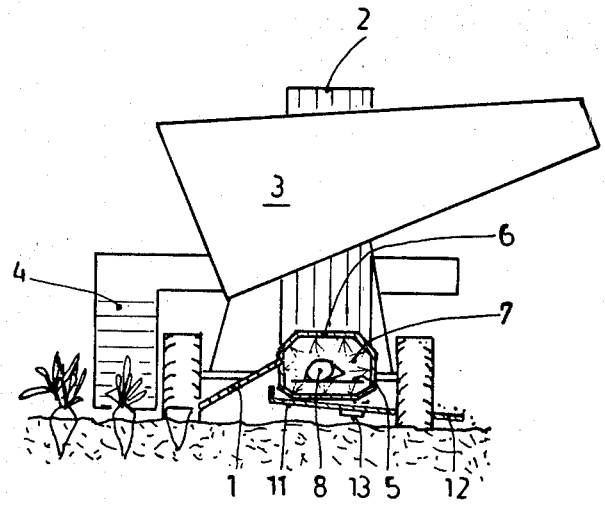
Figure 3:
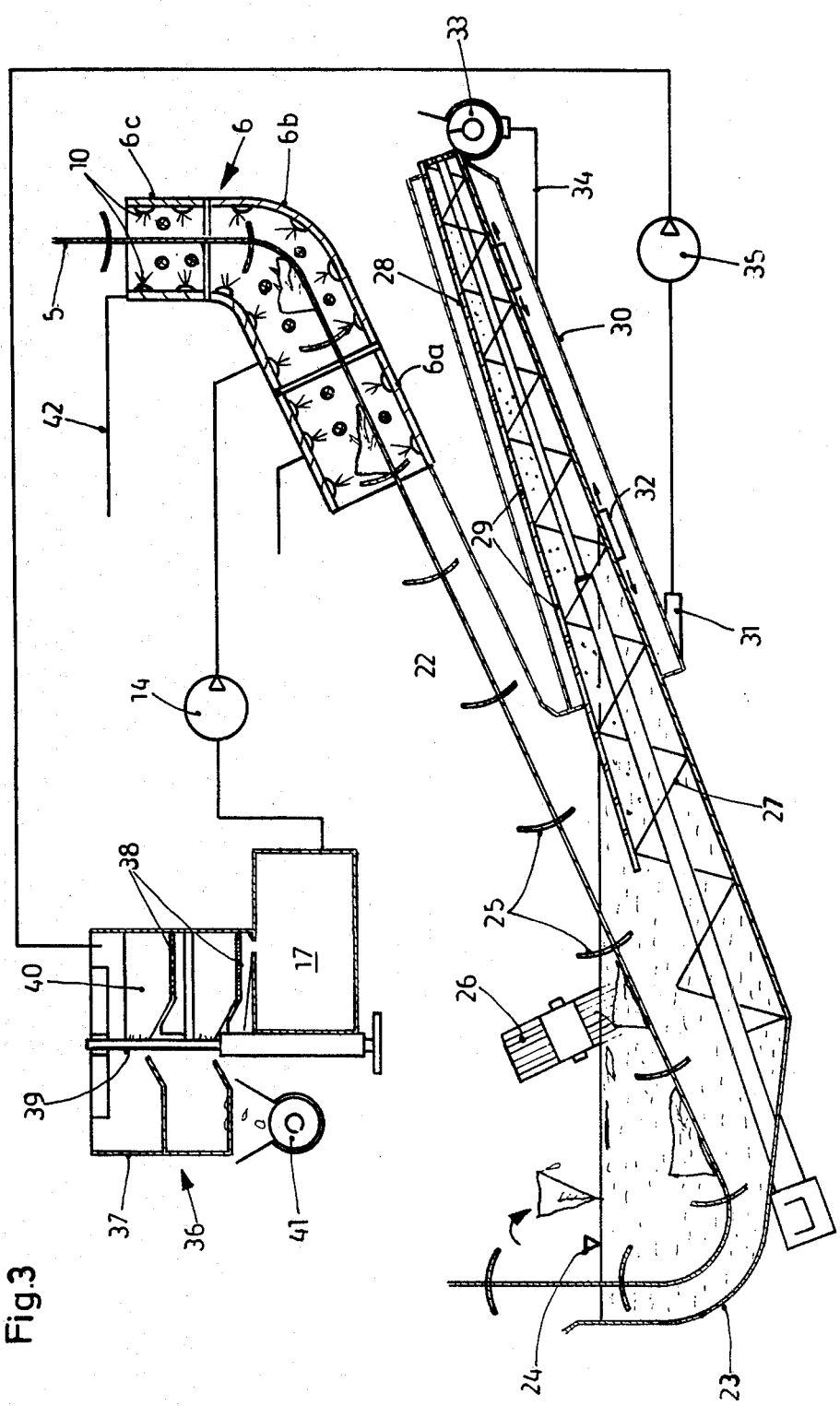
Figure 4:
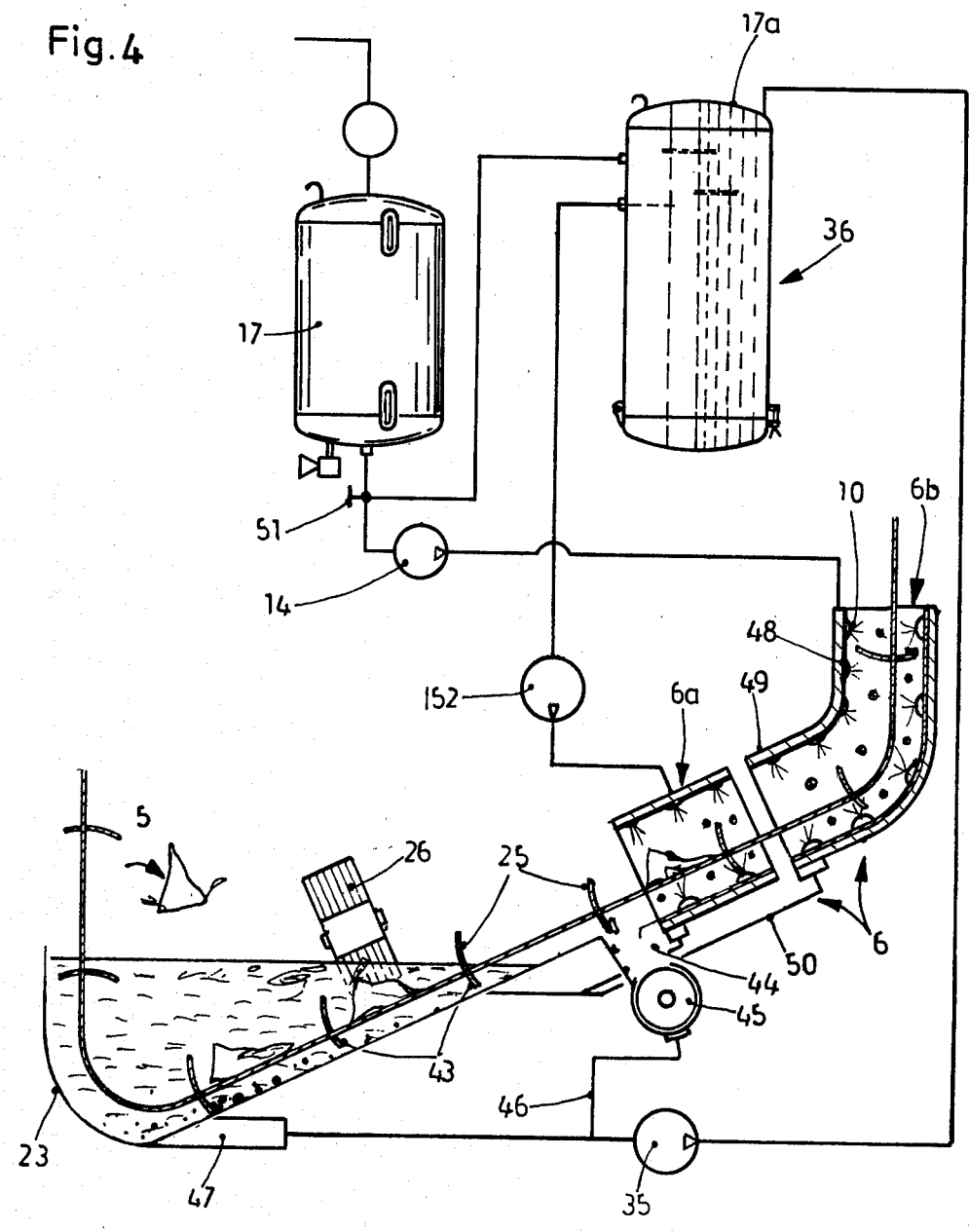
Figure 5:
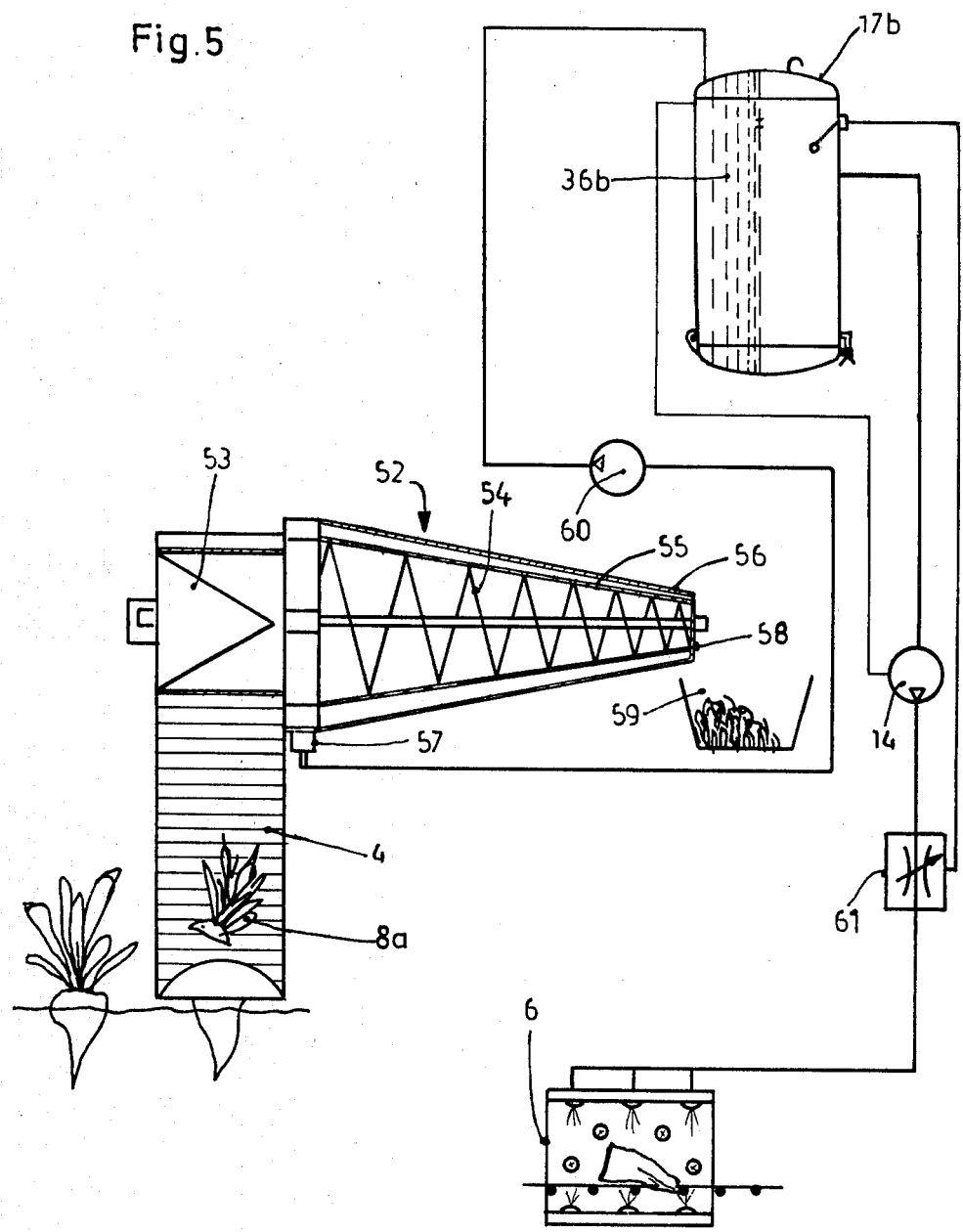

FIG. 1 is a schematic representation of a beet harvesting device with a built-in liquid reconditioning installation, FIG. 2 shows the detail of the liquid treatment installation by means of a block diagramm, FIG. 3 is a preferred embodiment of a liquid treatment installation with dirt removal, FIG. 4 is another embodiment of a liquid treatment installation with dirt removal and FIG. 5 is an embodiment with a sapping press.

DETAILED ACCOUNT OF WORKING EXAMPLES OF THE INVENTION

The beet harvesting machine represented in FIG. 1 is equipped in a known manner with cutting and lifting devices not specified in detail. The beheaded beets are introduced in an elevator 2 by means of the first conveyor belt 1. Elevator 2 transfers them into a bunker 3. The beet's heads mixed with leafs are collected by a second conveyor belt 4 represented schematically and are also introduced into a bunker, either in the condition as harvested or in a condition to be described later or are simply disposed laterally to the harvesting machine. On their way to elevator 2 the harvested beets are hit by water jets which loosen and remove the ahderent soil. In the embodiment shown a cleaning station 6 is passed through by a third conveyor belt 5 and is equipped with a circular arrangement of nozzles by means of which the beets to be cleaned can be hit from all sides during their passage through the cleaning station 6. With the jets 7 working continuously, a high throughput of the beets 8 laying on the conveyor belt 5 is possible and no control device is necessary.

As can be seen clearly from FIG. 2, the cleaning station 6 may consist of several cage-like annular conduits 9 having nozzles 10 at their inner circumference which are obtained simply by drilling. As can also be seen in FIG. 2 the third conveyor belt 5 may consist of a movable gridiron thus allowing water to touch the beets from all sides and allowing the water to flow away unrestricted. The embodiment of FIG. 1 shows a spilling pan 11 the bottom of which is inclined toward a discharge channel 12. The used water carrying the dirt simply flows away to the ground between the wheels on the side of the machine opposed to the cutting and lifting device. In order to obtain a reliable evacuation of settling dirt particles the spilling pan 11 and the discharge channel 12 may be vibrated slightly by means of a vibrator 13. For the continuous water supply to the nozzles 10, a high pressure pump 14, represented schematically in FIG. 2, is provided. The pump is connected to pressure line 15 which is connected by means of distribution lines 16 to the annular conduits 9, with the nozzles 10 being arranged cage-like side by side. The water reserve is contained in a tank 17 being mounted either directly on the beet harvesting machine or on the tractor. The intake line 18 of the high pressure pump may be connected directly to the tank 17 thus avoiding interruptions in the feeding.

For checking the filling level the tank 17 is equipped with glass gauges 19. However, an automatic control gear can be conceived, giving alarm by means of a horn 20 or the like as soon as the water level falls short of a given minimum. The water tank 17 will be filled either from time to time or permanently as will be explained in detail below. For this purpose a filling socket 21 is provided.

The embodiment represented in FIG. 3 also shows the cleaning unit having a tube-like housing containing at its inner circumference an encircling arrangement of nozzles 10. The supply lines for the nozzles 10 may be integrated in the housing which for this purpose may have a double shell arrangement. The tube-like housing of the cleaning unit 6 is inclined, and the lower end is directed against the direction of the motion of the third conveyor belt 5, so that the used dirt-charged water flows away freely. This water may be evacuated laterally. In the embodiment represented the water flowing out of the tube-like housing of the cleaning unit 6 is introduced by means of a guide plate 22 into a reservoir 23 located underneath the cleaning unit 6 in which the third conveyor belt 5 is passing. The beets to be cleaned are dumped in the reservoir 23 in which a sufficient quantity of water is maintained for a bath as indicated by the reference mark 24. The third conveyor belt 5, dips into the reservoir 23 and is equipped with appropriate carriers 25 each taking up one or several beets after a given stay-time in the bath and introducing them into the cleaning unit 6. The stay in the reservoir 23 softens the dirt adhering to the beets which then can be easily removed by the water jets acting upon the beets in the cleaning unit 6. Simultaneously the reservoir 23 acts as a buffer for the cleaning unit 6 allowing feeding a regular flow of beets to be cleaned into the cleaning unit 6, which is advantageous for efficiency.

If enough water is available the apparatus can be provided with an overflow connected to a channel directed laterally. In order to allow from time to time the evacuation of the dirt deposited, an appropriate trap may be arranged. However the reservoir 23 makes possible the use of a closed water circuit thus diminishing the water consumption. In this case a quantity of water corresponding to the one coming from the cleaning unit 6 is taken from the reservoir 23 and is introduced into a dirt collector. The solids thus collected may be dumped directly on the ground. The treated water may be introduced into a tank 17 (FIG. 2) from where the nozzles 10 may be fed.

The dirt collector may be a hydrocyclone fed with dirty water by means of a low pressure pump mounted to the reservoir 23, the water outlet of the cyclone being connected directly or indirectly to a high pressure pump feeding the nozzles 10 the outlet for the solids opening directly to the ground. The embodiment represented in FIG. 3 shows a multi-step dirt separation. To remove dirt floating on the water level a spiked belt or wheel 26 represented schematically is arranged to comb the water surface in the zone of emersion of the third conveyor belt 5. The dirt settling to the bottom of the reservoir 23 will be eliminated by another scuffling device. In the embodiment represented this device is a conical screw 27 ascendingly arranged in the reservoir 23. The drawing-in area of the screw is a groove in the bottom of the reservoir 23 (not represented), while the upper part of the screw is located in a strainer housing 28 which is partially above the water level. The water-dirt-mixture drawn from the bottom of the reservoir by the screw 27 is squeezed due to the conical shape of the screw 27. The water squeezed out can flow out of the pores 29 of the strainer housing 28 and can return to the reservoir 23. In the embodiment represented the strainer housing 28 is enveloped by a closed jacket 30 collecting the water. The jacket 30 is equipped with an outlet socket 31 for the pre-cleaning water, which can be reached from the reservoir 23 only via the strainer housing 28. If the pores 29 of the strainer housing 28 show a tendency to get plugged, this can be avoided by slight vibrations. The necessary vibrators 32 are represented schematically. The solids pressed out by the screw 27 are deposited onto another carrier arranged transversally to the screw. In the embodiment represented this carrier is a screw 33 dumping the solids to the ground aside the harvesting machine. The water squeezed out by the screw 33 returns to the jacket 30 of the screw 27 via the conduit 34.

To the outlet socket 31 of the jacket 30 is connected a low pressure pump 35 conveying the water drawn from the jacket 30 and thus indirectly from the reservoir 23 to a fine separation unit. This unit may be composed of one or several cyclones as mentioned above. In the embodiment represented this unit is a filtering unit 36, comprising a drum 37 into which the water coming from the low pressure pump 35 enters without counterpressure. In drum 37 are arranged one above the other two filter plates 38 preferably having different mesh or pore sizes. The deposits on the filter plates 38 are removed by means of sweepers. In the embodiment represented the sweepers are composed of blades 40 affixed to a vertical shaft 39. The solids removed are either directly dumped to the ground through a trap or, as represented in the present embodiment, are deposited on a carrier 41 evacuating laterally. The water coming through the filter plates 38 flows into a water tank 17 as in FIG. 2. For this purpose a pump may be used which would be connected with the drum 37. In the example represented the drum 37 is sitting directly above the tank 17 to which may be connected the high pressure pump 14 feeding the water to the cleaning unit 6.

In the example represented in FIG. 3 the cleaning unit 6 is composed of several, (in the present case of three) subsequent stages 6a, 6b, 6c. This allows for a multi-step treatment of the beets. In the last stage 6c the beets previously treated with water jets may be dried. By means of the pressure line 42 This stage may be connected to a source of compressed air not defined in detail. Both previous stages may be connected to the high pressure pump 14. However, it is conceivable to proceed to a pre-cleaning in the first stage 6a with water taken directly in the reservoir 23. Subsequently the cleaning operation is finished in the following stage 6b using clean water coming from tank 17. This clean water may be obtained by separation as shown in the example represented or by another process described in detail below or be simply poured into the tank 17 from an appropriate source.

The embodiment represented in FIG. 4 also represents a closed water circuit. Basically the concept is identical to the one of FIG. 3. Therefore the explanation of identical items can be avoided. In this embodiment the third conveyor belt 5 passing through the reservoir 23 simultaneously removes the solids from the bottom of the reservoir. For this purpose the third conveyor belt 5 is arranged approximately parallel to the bottom and provided with sweeping components 43 which may be transversal reglets or the like. These sweeping components 43 pass over a well 44 arranged transversally to the motion of the belt at the upper edge of the reservoir. The solids removed from the bottom of the reservoir will fall into this well. The bottom of well 44 is a channel in which is arranged a screw 45 squeezing the solids contained in the channel and conveying them laterally to be dumped to the ground. The return conduit 46 connected to the housing of screw 45 may be connected directly to the reservoir 23 or, as illustrated in the embodiment, may be a deviation of the pump intake connected to the outlet socket 47 of the reservoir. The well 44 is located between the reservoir 23 and the cleaning unit 6. Therefore the dirt loaded water coming from the cleaning unit flows into the well 44 via the guide plate 22. In order to maintain a sufficient water level in the reservoir 23, at least the rear stages of the cleaning unit could be a double shell structure, the inner shell being a strainer 48 bearing the nozzles 10. This component could be surrounded by a jacket 49 connected to the reservoir 23 by means of the pipe 50 by-passing the well 44.

The filter unit 36, fed by the low pressure pump 35 connected with the outlet socket 47 of the reservoir 23, is in the present example integrated in a water tank 17a supplying the water for the cleaning unit 6. The water tank 17a is connected to the high pressure pump 14 feeding the cleaning unit 6 in a parallel arrangement with the tank 17 provided to receive the water compensating the losses, the high pressure pump being connectable alternatively with tank 17 or with water tank 17a. Preferably the valve 51 is controlled by a monitoring system located in the water tank 17a in such a way that when falling short of a given level tank 17, (being practically a reserve tank), is connected. In the example represented in FIG. 4 the cleaning unit 6 is composed of two stages 6a and 6b arranged one behind the other. The second stage 6b is fed by the high pressure pump 14. The first stage 6a serving for the pre-cleaning is fed by a medium pressure pump 152 the intake of which is connected to the water tank 17a.

In the preceding embodiments the losses of water which cannot be avoided must be compensated with water taken from an appropriate source. In order to avoid this a water recovery installation may be provided. This kind of installation may e.g. recover the water in the ambient air. In the embodiment represented in FIG. 5 water is recovered from the heads and leaves of the beets harvested, these parts being mainly composed of water. This water is not only sufficient to compensate the losses of a closed circuit but covers the needs of an open circuit.

For this purpose a sap press 52 is represented in FIG. 5 which is fed with the beet heads and leaves 8a by means of a second conveyor belt 4 arranged after the cutting device. Preferably the sap press 52 is preceded by a crushing device which in the present case is a staw cutting device 53. If a buffer tank is arranged after the sap press 52, the sap press may be operated intermittently. In the example represented the sap press is working continuously. The sap press 52 is composed of a screw 54 diminishing in diameter in feeding direction being located in a strainer housing 55 which in turn is surrounded by a jacket 56 having a water outlet 57. At the small end of screw 54 is provided an interchangeable discharge nozzle being in the present case an apertured disk 58.

This allows passing the solids to small pellets, or the like which are directly fed to animals or easily dried and thus preserved. In the example represented a bucket 59 is provided for receiving the solids and which may be emptied from time to time into a truck placed alongside the field.

If the filtering action of the strainer housing 55 is sufficient the outlet 57 may be connected directly with a pump feeding the cleaning unit 6. In the example represented the water coming out of the sap press 52 is transferred to a filter unit 36b integrated in a water tank 17b. If the water tank 17b cannot be arranged directly under the sap press 52 as shown in FIG. 5, a low pressure pump 60 transfers the water coming out of the sap press to the water tank 17b containing the filter unit 36b and being connected to the intake pipe of the pump feeding the cleaning unit. In the example represented a high pressure pump 14 is provided followed by a throttle 61.

The preceding practical examples of the invention are not limiting. A certain number of possibilities are available to the man in the art for the adaption of the basic solution according to the invention to a given specific case.

The embodiments of the invention in which an exclusive privilege or property is claimed are as follows:

1. An installation mounted on a harvester for cleaning root crops in the field by spraying jets of water on all sides of the root crop after its removal from the soil, comprising:

a cleaning unit mounted on the harvesting machine having a plurality of inwardly directed peripherally arranged jets for spraying a cleaning liquid on all sides of the root crops to clean them;

conveyor means passing through said cleaning unit and permeable to the spray from said jets, capable of transporting the root crops to be cleaned through the cleaning unit and depositing them after cleaning in a crop storage bunker;

means for supplying cleaning liquid to the jets of said cleaning unit under pressure;

means for collecting the cleaning liquid after it has been sprayed to clean the crops;

means for removing residues cleaned from the crops from the collected water;

means for recycling said residue-removed water to the jets; and receiving device means for pre-soaking the root crops in cleaning liquid comprising:

a conveyor means for conveying the root crops from the ground to a pre-soaking reservoir containing cleaning liquid, and a conveyor means for conveying the root crops through said pre-soaking reservoir, wherein the receiving device is embodied by a reservoir (23) having an opening for the introduction of the root crops and being located at a lower level than the cleaning unit (6) and in which passes the third conveyor belt (5) having carriers for the root crops to be cleaned, the cleaning unit (6) being a strainer

(48) having nozzles (10) and being enveloped by a jacket (49) the interior of which can be emptied into the reservoir (23).

2. An installation according to claim 1, wherein the outlet socket (31 respectively 47) of the reservoir (23) is connected to a low pressure pump (35) feeding into a filtering unit (36) comprising a drum (37) in which at least one filter plate (38) is arranged to which belongs a blade (40) for the removal of the solids, a tank (17 respectively 17a) for the liquid being installed behind the filter unit (36) and a high pressure pump (14) or a medium pressure pump (152) aspirating liquid from the tank to feed it to the cleaning unit (6) and wherein at least one scraping device (26 respectively 27, respectively 5, respectively 43) having carriers collecting the dirt residues is provided.

3. An installation according to claim 2, wherein the scraping device is a screw (27) having a diameter diminishing in the feeding direction and being arranged ascendingly being equipped with a vibrating device, the intake side of which being located in a channel on the bottom of the reservoir (23), the upper part being borne in a strainer housing (28) situated above the water level (24), said strainer housing being externally enveloped by a jacket (30) having an outlet socket (31).

4. An installation according to one of claims 1, 2, or 3 wherein in the zone of emersion of the conveyor belt (5) is arranged a spiked belt or wheel (26) having spikes penetrating in the liquid and moving perpendicularly to the motion of the conveyor belt (5).

5. An installation according to one of claim 1, 2, or 3, wherein a top and leaf conveying device (4) being embodied preferably as a straw cutting device working continuously feeds the vegetable products cut off from the crops after harvesting into a sap press (52) having at the outlet side an interchangeable discharge nozzle (58) for the pressed-out material, said sap press being followed by a filter unit (36b).

6. An installation according to claim 5, wherein the sap press (52) is embodied by a screw (54) having a cross section diminishing in feed direction and being borne in a strainer housing (55), said strainer housing being enveloped by a jacket (56) closed externally and having an outlet (57).

7. An installation according to claim 1, wherein the cleaning unit (6) comprises several subsequent stages (6a respectively 6b, respectively 6c) and the intermediate stage (6b) being supplied with water from a high pressure pump (14) the liquid having comparably the highest cleaning efficiency and the last stage (6c) seen in the feeding direction of the conveying component (5) is connected to a compressed air line (42).

* * * * *